UNITED STATES PATENT OFFICE.

GEORGE G. BRIGGS, OF CHICAGO, ILLINOIS.

IMPROVEMENT IN STOVE-POLISH LIQUIDS.

Specification forming part of Letters Patent No. 199,407, dated January 22, 1878; application filed June 26, 1877.

*To all whom it may concern:*

Be it known that I, GEORGE G. BRIGGS, of Chicago, in the county of Cook and State of Illinois, have invented a certain Compound to be known to the trade by the name of "Eureka Liquid Stove-Polish," of which the following is a specification:

This invention relates to that class of compounds used for polishing stoves; and it consists in a composition of different materials, to be sold in such fluid condition as to be ready for use without the waste of time for dissolving powder or cakes, as heretofore has been the general practice.

For preparing my stove-polish I mix one and a half pound of carburet of iron, preferably of the kind imported from Italy, and known to the trade as "Ceylon," and the same weight of ivory-black, with one gallon of water. In a separate vessel I melt one pound of hard soap in one pint of soft water, and add the same to the above mixture. This compound I let stand for about ten hours, after which time it is filled into bottles, ready for the market.

About four drops of oil of sassafras added to each bottle will neutralize the unpleasant flavor of the polish during the application of the same.

One-half pound of logwood-bark, boiled about twenty minutes and mixed with the above, will prevent the freezing of the liquid during cold weather.

This polish is applied to the stove while the same is quite warm, and is afterward rubbed with a soft brush or woolen cloth.

What I claim as my invention, and desire to secure by Letters Patent, is—

A fluid stove-polish wherein carburet of iron, ivory-black, hard soap, and water are compounded, substantially as described and specified.

GEORGE G. BRIGGS.

Witnesses:
WM. H. LOTZ,
EMIL H. FROMMANN.